TAPE DRIVE MECHANISM

Filed April 27, 1959 5 Sheets-Sheet 1

INVENTOR.
Konrad W. Schoebel
BY
Townsend and Townsend
Attorneys

INVENTOR.
Konrad W. Schoebel
BY
Townsend and Townsend
Attorneys

April 2, 1963 K. W. SCHOEBEL 3,083,925

TAPE DRIVE MECHANISM

Filed April 27, 1959 5 Sheets-Sheet 3

INVENTOR.
Konrad W. Schoebel
BY
Townsend and Townsend
Attorneys

April 2, 1963 K. W. SCHOEBEL 3,083,925

TAPE DRIVE MECHANISM

Filed April 27, 1959 5 Sheets-Sheet 4

INVENTOR.
Konrad W. Schoebel
BY
Townsend and Townsend
Attorneys

April 2, 1963 K. W. SCHOEBEL 3,083,925

TAPE DRIVE MECHANISM

Filed April 27, 1959 5 Sheets-Sheet 5

*INVENTOR.*

Konrad W. Schoebel

*BY*

Townsend and Townsend attorneys

United States Patent Office 3,083,925
Patented Apr. 2, 1963

3,083,925
TAPE DRIVE MECHANISM
Konrad W. Schoebel, Palo Alto, Calif., assignor to Precision Instrument Company, San Carlos, Calif.
Filed Apr. 27, 1959, Ser. No. 809,282
11 Claims. (Cl. 242—55.13)

This invention relates to a magnetic recording apparatus for use with magnetic tape and is a continuation-in-part of my copending United States patent application, Serial No. 737,158, filed May 22, 1958, and now abandoned.

The principal object of this invention is to provide a magnetic recording apparatus which is relatively small and light in weight and yet which provides extreme flexibility, accuracy and precision so as to allow the recorder to be used for instrumentation recording purposes.

The magnetic recording apparatus of this invention incorporates a tape drive mechanism which drives a pair of stacked reels by means of coaxial driving shafts and employs a magazine that houses the tape carrying reels. The magazine is constructed to be easily detached from the main body of the tape recording assembly in such a way that the recording stretch of tape is arranged to straddle the drive and transducer elements on the recording deck without making physical contact with the elements during installation and removal of the magazine from the main body of the recording apparatus.

A feature and advantage of the tape magazine is that the magazine may be freely installed and removed from the main body of the tape recorder without the concurrent problems of threading or aligning the tape relative to the tape drive and transducer elements.

Another object of this invention is to provide a new and improved tape carrying magazine having among its features the advantage of a book opening construction wherein the magazine whether installed on or removed from the main tape drive unit is capable of being opened in book-like fashion so as to allow free access to the tape carrying reels within the magazine.

In the improved magazine of this invention each of the tape carrying reels is rotatably mounted on the inside face of the two cover plates of the magazine so that when the magazine is opened the two reels are located in side by side relationship and when the magazine is closed the reels are located in stacked relationship.

Another object of this invention is to provide a novel tape guide mechanism incorporating in the magazine a pair of spaced apart parallel guides arranged to guide a stretch of tape to travel in a coplanar path between the two reels.

A still further object of this invention is to provide the tape magazine with a simple, novel apparatus that selectively prevents rotation of the tape reels carried by the magazine when the reels are disengaged from the coaxial reel driving shafts such as, for example, when the cover of the magazine is in the opened position or when the magazine is removed from the tape drive mechanism.

Other objects of the present invention will become apparent upon reading the following specification and referring to the accompanying drawings in which similar characters of reference represent corresponding parts in each of the several views.

Figure 1:
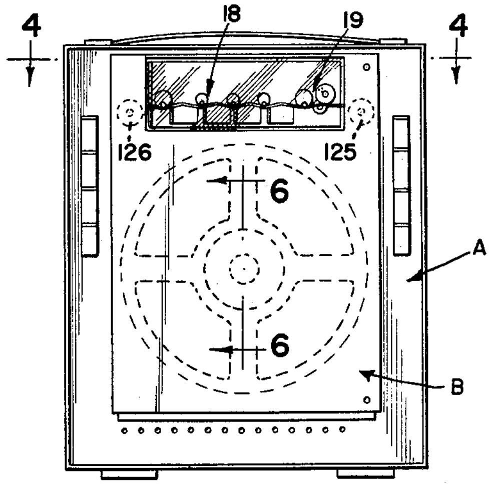
FIG. 1 is a top plan view of the tape recorder of the invention shown with the magazine attached to the recorder in the closed position.

In the principal embodiment of this invention the magnetic tape recording mechanism is constructed in two major components consisting of a main body A and a magazine B which is arranged for removable attachment on the main body. Main body A has on its outer face a recording deck C comprising transducers and capstan drive elements and the interior of the main body carries the appropriate motors for driving the capstan and tape reel actuating shafts in addition to carrying the electrical components necessary for the control of the tape drive and effecting the magnetic reading and writing.

Magazine B carries a take-up reel 15 and a feed reel 16 mounted within the magazine in stacked coaxial relation in such a way that when magazine B is mounted on main body A the reels will be driven by the reel driving shafts carried by the body and a tape stretch guided by guides carried within the magazine will be arranged to pass over the magnetic transducer assembly 18 and the tape drive mechanism 19 of recording deck C.

The two reels 15 and 16 are driven by the two coaxially mounted shafts 25 and 26 which project outwardly from the face plate of body A. The outer shaft 25 is arranged to engage take-up reel 15 and the central hub of the take-up reel is apertured at 37 to allow the inner shaft 26 to operatively engage with reel 16.

Figure 2:
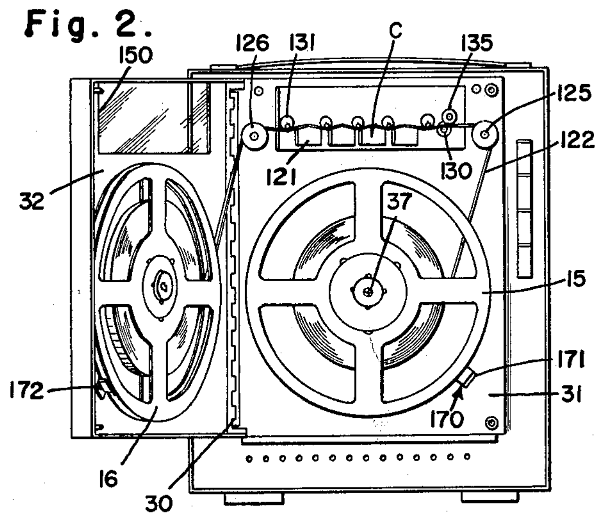
FIG. 2 is an identical view to FIG. 1 but with the magazine in the open position.

Magazine B is constructed in book-like fashion having a hinge 30 which allows the two broad faces 31 and 32 of the magazine to be swung open as indicated in FIG. 2. Feed reel 16 is pivotally mounted on face 32 and take-up reel 15 is pivotally mounted on face 31. By this means when the magazine is in the open position the two reels are arranged in substantially side by side relationship and when the magazine is closed with the two broad faces 31 and 32 in spaced juxtaposition the two reels are in coaxial stacked relationship.

The bottom edge 33 of the magazine is formed with a lip 34 which is arranged to fit in a guide notch 35 on the face plate 50 of main body A. The magazine is installed on body A by inserting lip 34 into guide notch 35 and positioning the outer surface of face 31 against the face plate of the main body wherein mating snap connector elements 36 mounted on the face plate of body A and on the outer surface of face 31 are arranged to snap lock magazine B in fixed position on body A.

Figure 3:
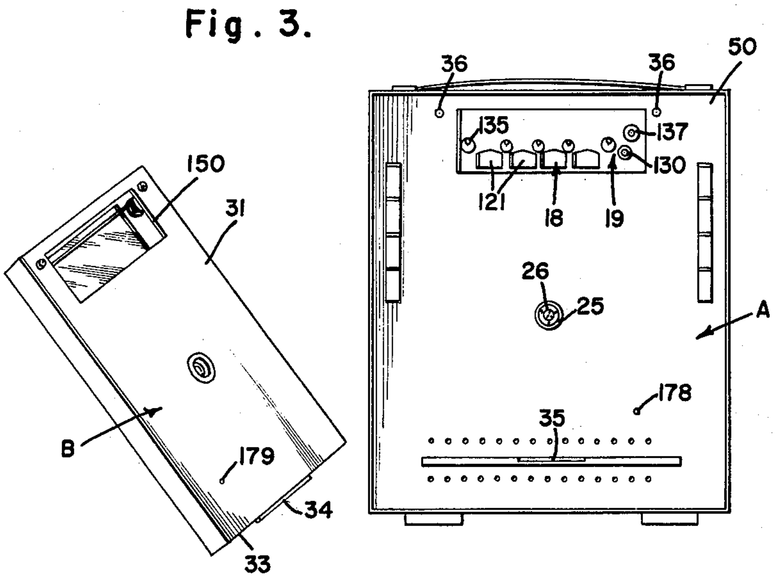
FIG. 3 is an identical view to FIG. 1 with the magazine removed and shown adjacent the tape recorder body in prospective.

As can be seen with reference particularly to FIGS. 1, 2 and 3, the magazine when mounted on the main body may be opened in book-like fashion so that free access may be had to the two tape reels carried by the magazine. This feature allows free visual and mechanical access to each of the tape reels and allows the reels to be changed or the tape to be removed or adjusted while the magazine is installed on the recorder.

Lip 34 when engaged with notch 35 is arranged to hinge the magazine relative to body A and align the magazine so that when the magazine is swung towards body A the two shafts 25 and 26 will be in mating alignment with the respective hubs of the tape reels.

Figure 6:
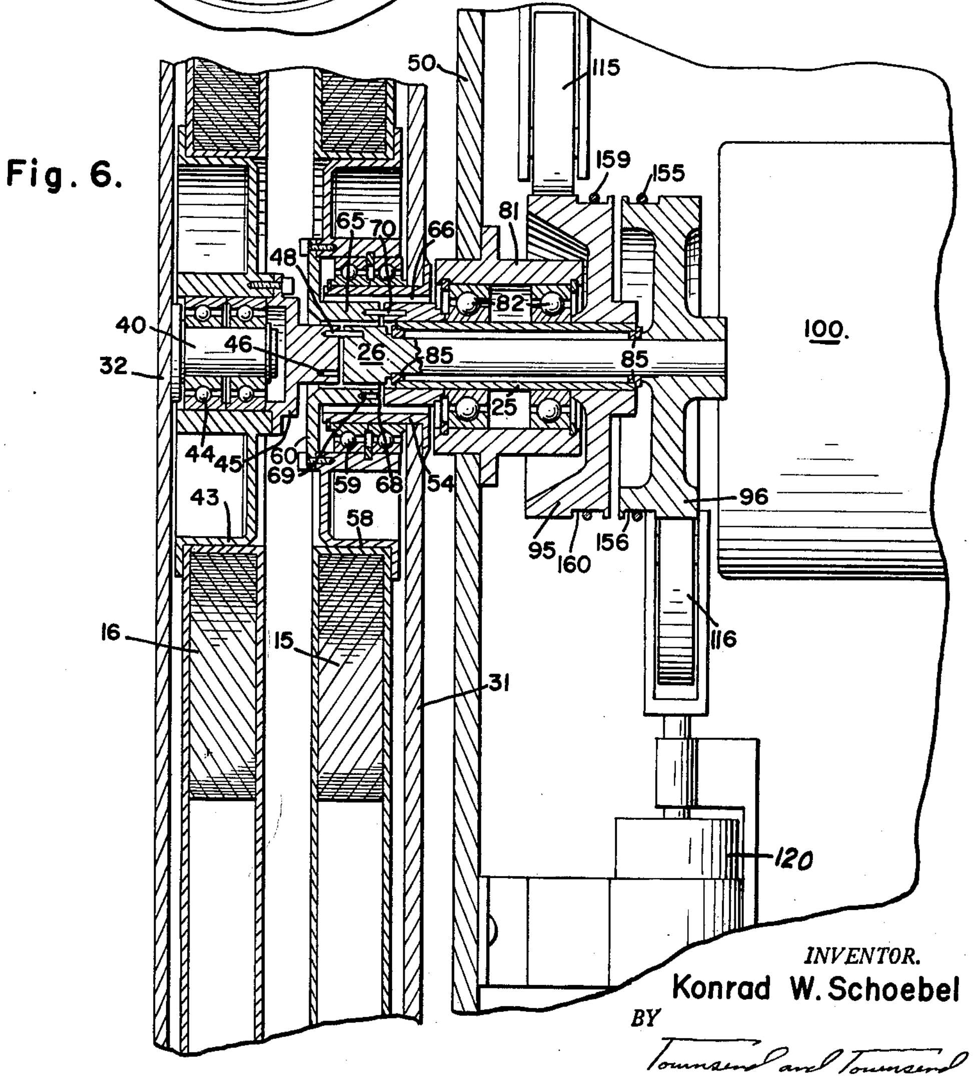
FIG. 6 is a fragmentary sectional view of FIG. 1 taken at line 6—6 and specifically showing the co-axial shafts and connection of the shafts with the take-up and feed reels within the magazine.

In greater detail and with particular reference to FIG. 6, feed reel 16 is pivotally mounted on the inside of the front broad face 32 of the magazine by an axle 40 and is connected to the axle by means of bearings 44 so that the reel is freely rotatable about the axle.

An axially mounted coupling head 45 is connected on hub 43 and is formed with a tip having a coaxial annulus of apertures 46 arranged to be engaged by mating pins 48 projecting outwardly from the tip of shaft 26 so that when the pins are mated with the apertures shaft 26 and reel 16 are connected in positive engagement.

Take-up reel 15 is pivotally mounted on a hollow axle 54 fixedly mounted on rear surface 31 of the magazine and projecting inwardly therefrom. Hub 58 of reel 15 is rotatably connected to axle 54 by bearings 59 so that reel 15 is freely rotatable about the axle.

A coupling insert 60 is mounted on the inner face of hub 58 which is formed to provide a hollow annular collar 65 projecting interiorly of bore 66 of axle 54. The bore of collar 65 is formed sufficiently larger than shaft 26 and the mating section of coupling head 45 and is in axial alignment therewith so that shaft 26 can freely rotate in spaced relation to collar 65. The tip of collar 65 is provided with an annulus of apertures 69 into which pins 70, projecting outwardly from the tip of driving shaft 25, are arranged to nest to effect a connection between shaft 25 and reel 15.

Shaft 25 is pivotally connected to front face 50 of main body A by a bearing assembly 81 comprising rollers 82 positioned at two spaced apart points along the longitudinal axis of shaft 25. Shaft 26 is rotatably supported from shaft 25 by two bearings 85 mounted on substantially opposite ends of shaft 25 to position the two shafts in coaxial aligned relationship with the provision of completely free relative rotational movement.

Shaft 25 is driven by a driven pulley 95 fixedly mounted on the end of shaft 25 below bearing 81 and shaft 26 is driven by a pulley 96 mounted on the end of shaft 26 below bearing 85 and pulley 95.

A reversible constant torque motor 100 is arranged to alternately drive shafts 25 and 26 to cause reels 15 and 16 to be driven in the reverse and forward directions. The motor carries on its driving shaft 101 two driving pulleys 105 and 106 which are arranged in spaced coplanar relationship with driven pulleys 95 and 96 respectively. Two clutching idlers 115 and 116 alternately couple the motor with the respective shafts 25 and 26. The two clutching idlers 115 and 116 are alternately actuated by solenoids 119 and 120 respectively so as to clutch either driving idler 105 with driven pulley 95 or driving idler 106 with driven pulley 96.

To drive the tape drive unit in the forward direction motor 100 is driven in the forward direction. Then idler 116 is meshed with driving pulley 106 and driven pulley 96 by actuating solenoid 120 which clutches motor 100 to drive shaft 26. When solenoid 119 is energized and motor 100 is driven in the reverse direction idler 115 is forced against driving pulley 105 and driven pulley 95 to cause reverse rotation of shaft 25. Thus by control of the direction of motor 100 and the two idlers 115 and 116 through solenoids 119 and 120 either of the idlers 115 or 116 may be driven in either of two selected directions independently of the other reel.

Transducer assembly 18 and recording deck C comprises a plurality of transducers 121 over which the tape 122 carried on reels 15 and 16 is registered to travel.

Magazine B is constructed with two guide rollers 125 and 126 mounted for rotational movement about parallel axes on shafts 127 and 128 respectively. The two shafts are mounted on face 31 of the magazine.

The line of tape travel between rollers 125 and 126 is in a coplanar path on an axis skewed with respect to the rotational axis of the two reels 15 and 16. The tape twist on the stretch of tape between the two reels is absorbed in the area of tape travel between guide rollers 125 and 126 and reels 15 and 16 respectively so that the tape travel between the two guide rollers is absolutely flat and untwisted. Each of the guide rollers 125 and 126 is aligned in elevational alignment on the exact plane of the respective reels 15 and 16.

Face 31 of magazine B is formed with an aperture 150 which is arranged in alignment with recording deck C to allow the recording deck to project outwardly from face 50 of main body A of the recorder inwardly into the interior of the magazine to position transducer assembly 18 and tape drive mechanism 19 in alignment with the tape stretch between guide rollers 125 and 126.

Recording deck C is mounted on face plate 50 by mounting brackets 129 which are adjustable so as to allow the recording deck to be positioned in angular relationship relative to the face plate in such a way as to facilitate the exact and precise alignment of the recording deck relative to the tape travel between guide rollers 125 and 126. In this way the recording deck may be adjusted, by the adjustment of brackets 129, so that each of the transducers 131 and the tape drive mechanism 19 are in exact coplanar relation relative to the tape stretch.

The tape drive mechanism includes a capstan 130 which is continuously driven by a motor 131 through a belt and pulley network 132. Motor 131 is mounted directly on the rear face of the recording deck so that the rotational axis of the motor is exactly normal to the axis of the deck to facilitate precise alignment of the capstan drive linkage.

Guide rollers 125 and 126 are aligned so that the tape stretch between the two rollers is sufficiently above the face of transducers 121 and capstan 130 so as to be completely free of contact with the transducers and capstan.

Tape guide pins 135 are mounted on opposite sides of each of the transducers and are eccentrically mounted on rotatably mounted plates 136 so as to be movable from a first position above and completely free from contact with the tape stretch to a position slightly below the face of transducers 121 and in biasing contact with the tape. There is one guide pin 135 on opposite sides of each transducer so that during the reading or writing phase of tape travel the tape is held against transducers 121 by the eccentrically mounted pins so as to bias the tape against the transducer by causing the tape travel from the pins up over the transducer.

The tape drive at the recording deck is caused by a pinch roller 137 which is eccentrically mounted on a shaft 139 to force the tape against capstan 130 and cause the tape to be pulled past the recording station. The capstan and the pinch roller are mounted on a rotational axis exactly normal to the plane of recording deck C and are aligned in precise coplanar alignment with the tape stretch.

Figures 4, 5:
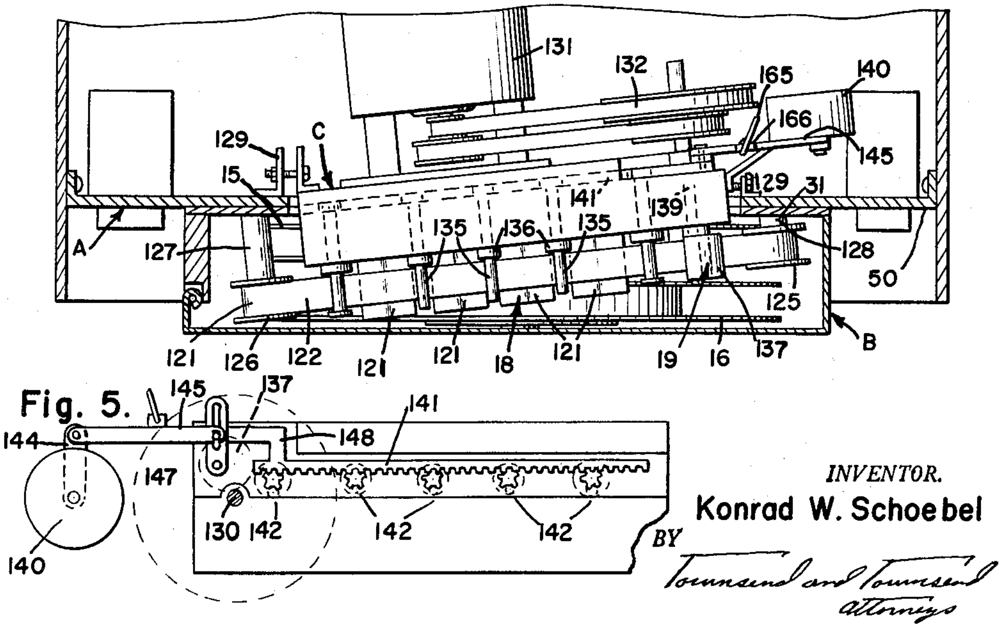
FIG. 4 is a fragmentary cross-sectional view of FIG. 1 taken at line 4—4.
FIG. 5 is a diagrammatic view illustrating the operative components for the tape drive recording and drive deck.
Figure 7:
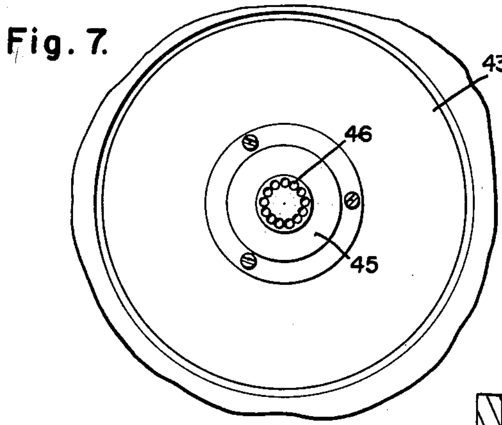
FIG. 7 is a fragmentary view showing the hub section of the feed reel.
Figure 8:
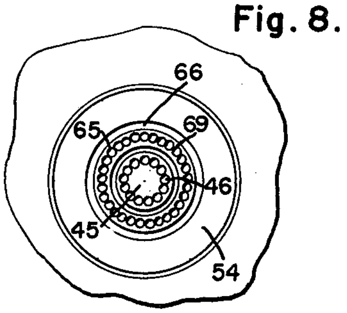
FIG. 8 is a fragmentary end view of the hub section of a take-up reel with the magazine in the closed condition.
Figure 14:
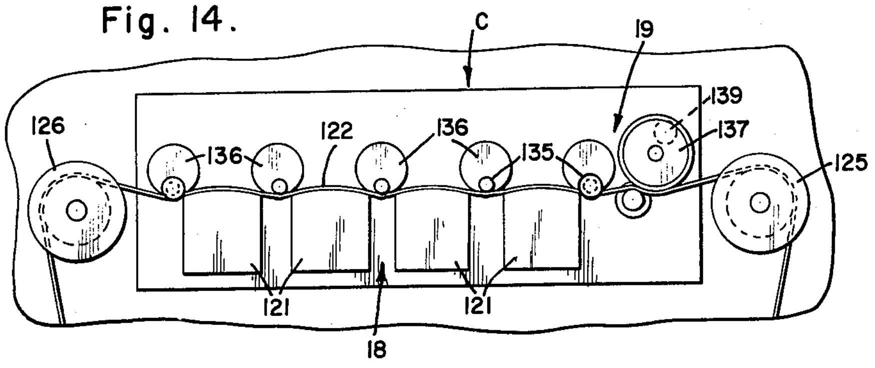
FIG. 14 is a plan view of the recording deck showing the components in the operative condition for magnetic reading and writing.
Figure 15:
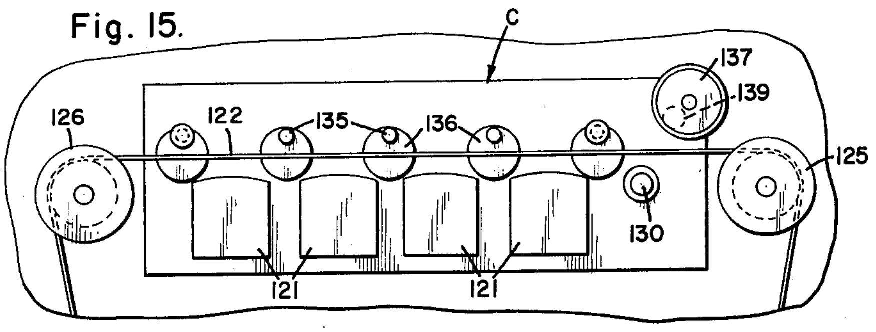
FIG. 15 is a plan view of the deck of FIG. 14 showing the components in the open or inoperative condition.

The mechanism to cause pinch roller 137 and pins 135 to be actuated is mounted on the back face of recording deck C and comprises a solenoid 140 which is arranged to control pinch roller 137 and tape guide pins 135. Plates 136 of the guide pins are rotated by a rack 141 which engages pinions 142 connected to the respective plates 136 so that the entire bank of pins is caused to move simultaneously with the movement of the rack. The rack and shaft 139, upon which pinch roller 137 is eccentrically mounted, are actuated by a linkage arrangement comprising an arm 144 fixedly mounted on the solenoid so as to be rotatable therewith. A linkage arm 145 is pivotally connected to arm 144 on one end and pivotally and slidably connected to one end of an arm 147, the other end of which is fixedly connected to shaft 138 so that the pinch roller is rotated with the actuation of the solenoid. The rack is pivotally connected to linkage arm 145 by a leg 148 which is fixedly mounted on the top portion of the rack. Thus as viewed in FIG. 5, when the solenoid is moved in a clockwise direction the entire bank of pins 135 and pinch roller 137 are moved simultaneously to the tape engaging position, as seen in FIG. 14, and when solenoid 140 is moved in the counterclockwise direction the entire bank of pins and the pinch roller are moved to a position substantially above the tape so that the tape is completely free of contact with pins 135, pinch roller 137, transducers 121 and capstan 130 as seen in FIG. 15. The structure of the capstan, pressure roller, and tape drive mechanism is claimed in a co-pending divisional application.

Figures 9, 10, 11, 12, 13:
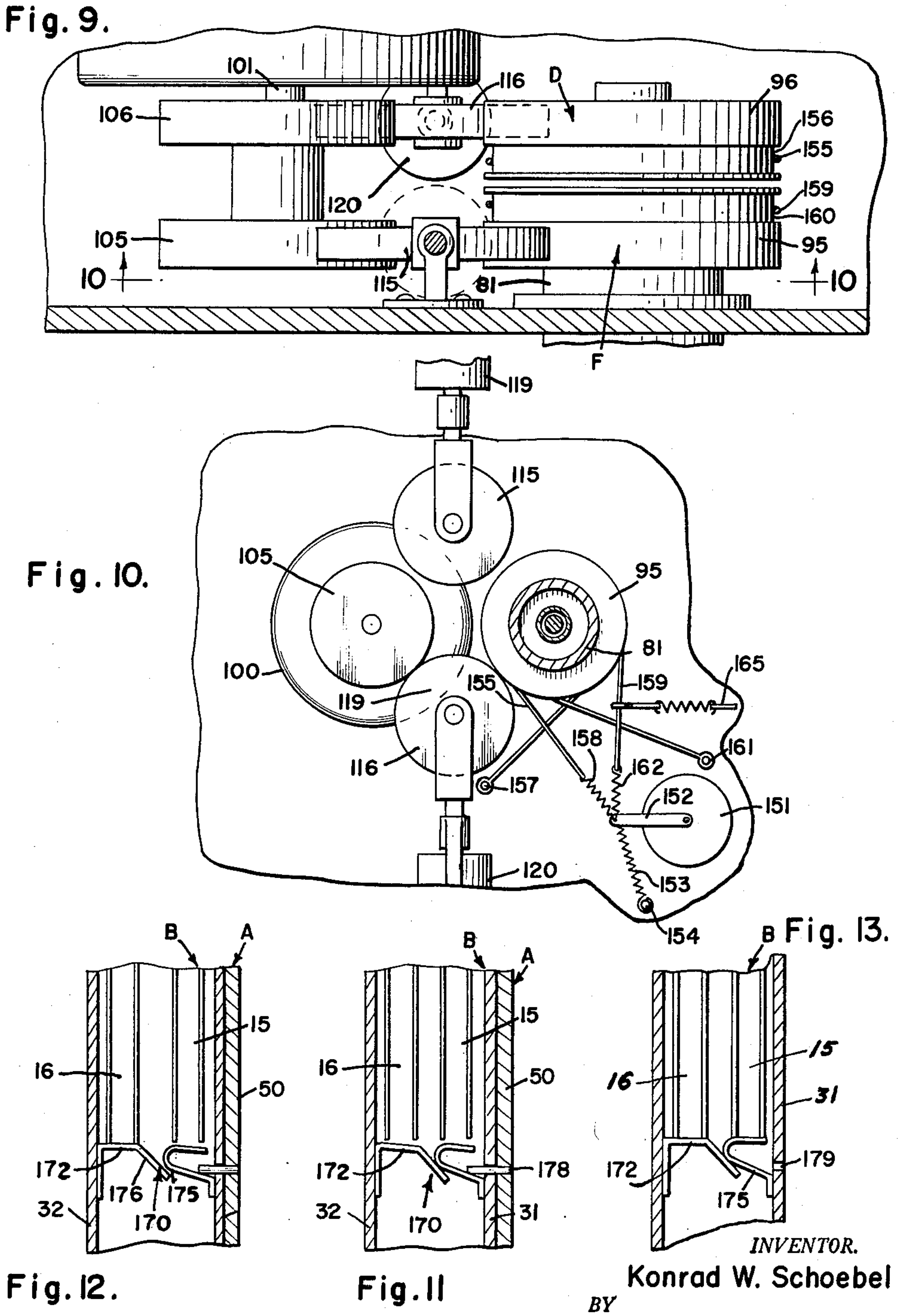
FIG. 9 is a fragmentary elevation showing the clutch and reel drive and brake mechanism.
FIG. 10 is a top plan of FIG. 9 shown in reduced dimension.
FIG. 11 is a fragmentary sectional view of the reel locking mechanism within the magazine shown with the magazine in the closed condition and mounted on the main body of the tape recorder.
FIG. 12 is a similar view to FIG. 11 showing the magazine in the opened condition.
FIG. 13 is a similar view to FIG. 11 showing the magazine detached from the main body of the tape recorder.

A brake mechanism to stop reels 15 and 16 operates in conjunction with pulleys 95 and 96 and is actuated by a solenoid 151 of the rotating type which rotates an arm 152. The arm is biased by a spring 153 connected to an anchor pin 154. A nylon belt 155 is arranged to pass from arm 152 around a groove 156 on the rim of driven pulley 96 and is attached, after passing approximately 350° in a clockwise direction as seen in FIG.10, to an anchor pin 157. A spring 158 is connected between nylon belt 155 and arm 152. A similar nylon belt 159 is connected to arm 152 and is arranged to pass around a groove 160 on the rim of pulley 95 in a counterclockwise direction, as viewed in FIG. 10, and after passing approximately 350° around the pulley is connected to an anchor pin 161. A spring 162 separates arm 152 and nylon belt 159.

When solenoid 151 is in the de-energized condition spring 153 has sufficient tension or biasing force to cause the two nylon belts 155 and 159 to be tightly urged against the two rings or grooves 156 and 160 of the two driven pulleys 95 and 96 respectively. The force of the nylon belt against the driven pulleys is sufficient so as to create a brake which will effectively prevent rotation of the pulleys.

When solenoid 151 is energized the solenoid acts against spring 153 and releases the tension against the two nylon belts 155 and 159 thus allowing both driven pulleys 95 and 96 to be in condition for free rotation.

Electrical circuitry, not shown, is arranged to interlock the action of solenoid 151 with solenoids 119 and 120 so that when either solenoid 119 or 120 is in the clutching condition solenoid 151, which de-actuates the braking mechanism, will be in the operative condition and conversely when both solenoids 119 and 120 are in the declutching condition solenoid 151 will be de-energized so that the braking action will take place.

When the tape is driven in the forward direction, that is from reel 16 to reel 15, the action of nylon belt 155 against pulley 96 is such that the braking force is pulled against spring 158 thus providing some degree of yielding in the braking force as applied to pulley 96.

The braking force, however, for reel 16, which is the feed reel in this phase of operation, is against anchor pin 161 so that there is no yielding of nylon belt 159. By means of this mechanism the braking force for reel 16 will be immediate and positive while the braking force for feed reel 15 will be yieldable or approximately one-half of the braking force as applied to the other reel. This is an important feature in that it is necessary to supply the feed reel with substantially more force than the driving reel in order to prevent premature stoppage of the driving reel which would result in possible tape spillage.

When the recorder is operated in the rewind condition, that is when the tape is driven from reel 15 to reel 16, pulleys 95 and 96 are each driven in the opposite direction so that belt 155 will be actuated against pulley 96 against positive anchor pin 157 and conversely belt 159 will be actuated directly against spring 162 which will allow some yielding of the belt during the application of the braking force. Thus in the rewind condition of operation reel 15 will be stopped with more positive force and reel 16 will be stopped with a more yieldable force.

During the reading and writing condition of operating it is desirable to have a minimal braking force applied to feed reel 16. The force should be sufficient so that the reel will maintain tension on the tape and will not rotate to cause unraveling or loosening of the tape on the feed reel. To accomplish this function a connecting nylon string 165 is attached to nylon belt 159 between spring 158 and driven pulley 95. String 165 is connected directly to linkage arm 145 as indicated at 166 in FIG. 4.

String 165 is connected to linkage arm 145 so that when solenoid 140 is operated to move in the clockwise direction to cause the tape recording deck to be in the operative or tape engaging condition of operation, string 165 is tensioned sufficiently to cause a slight braking force of belt 159 against driven pulley 95. This causes a sufficient dampening or braking force against reel 16 to hold tape tension. The brake mechanism thus has the function of operating directly with the operation of solenoid 140 to cause a tensioning or slight braking against the rotation for reel 16 and provides for the complete stoppage or braking of both the reels when the motor is disengaged from driving contact with both the reels. This brake mechanism is claimed in a copending divisional application.

A reel locking mechanism or brake means 170 is provided with magazine B to prevent reels 15 and 16 from rotating when the reels are disengaged from their respective driving shafts 25 and 26. When the magazine is attached to main body A and is open, as seen in FIG. 2, reel locking device 170 retains reel 16 in locked position so that the tape will remain tensioned between the two guide rollers 125 and 126. Furthermore, the reel locking means locks both the reels in position when magazine B is completely removed from main body A, as indicated in FIG. 3. Thus the tape stretch between the two guide rollers 125 and 126 is always maintained in a taut condition so that when the magazine is installed on main body A the tight stretch of tape will nest between pins 135 and transducers 121 without any necessity of threading or positioning the stretch of tape between the various components on recording deck C.

The reel locking mechanism or brake means, as seen in FIGS. 11, 12 and 13, includes a spring clip 172 mounted on the inside wall of face 32 adjacent the peripheral edge of reel 16 urged inwardly towards the outer edge of the reel so as to normally prevent the reel from rotating. A second spring clip 175 is mounted opposite spring clip 172, on the inside wall of face 32 adjacent the peripheral edge of reel 15 and normally biased to rest against the peripheral edge of reel 15 so as to prevent rotation of the reel. Clip 172 has its inner edge bent to nest against the inner edge of clip 175 with both the clips being arranged to be normally biased or urged against the reels. A pin 178 is provided on the top face 50 of main body A in alignment with the clips. Face 31 of the magazine is apertured as at 179 in alignment with pin 178 so that the pin is arranged to project inwardly into the interior of the magazine and engage the under-surface of spring clip 175 to urge the clip away from engagement with reel 15. The inner wall of clip 175 is arranged when engaged by the pin to engage the inner wall of clip 172 and urge clip 172 away from contact with the peripheral edge of reel 16.

The reel locking mechanism or brake means 170 thus functions to lock both reels 15 and 16 against rotation when the magazine is detached from the main recorder body as seen in FIG. 13 wherein both clips 172 and 175 are spring urged against the respective tape reels. When the magazine is installed on the tape recorder body pin 178 projects inwardly into the interior of magazine B to deflect or move clips 175 and 172 out of engagement with the two reels thus freeing them for rotational movement. The reels are, however, retained against rotation by the contact of the drive through shafts 25 and 26 at approximately the same instant that reel locking mechanism 170 is disengaged. When the magazine is opened as indicated in FIG. 2 only clip 172 is free to lock reel 16 in position as indicated in FIG. 12. In such a condition, pin 178 retains clip 175 in the disengaged condition so that with the magazine in the opened condition reel 16 is locked against rotation by locking mechanism 170 and reel 15 is locked in position by shaft 25 but is free to rotate with respect to spring clip 175. Therefore it is apparent that the mechanism is operable to record even with the magazine in the opened condition as viewed in FIG. 2. The spring clip 172 offers sufficient braking force against reel 16 to retain tape tension and all the tape twists between the reel and the recording deck occurs between guide roller 126 and the reel so that the tape stretch between the two guide rollers 125 and 126 is maintained in its straight untwisted relationship. This is an extremely important feature of this invention wherein the magazine allows the recorder to be operated in the forward direction with the magazine in either the opened or in the closed position.

In operation magazine B is provided with a roll of tape wound on take-up or drive reel 15 and feed reel 16 with the tape stretched between rollers 125 and 126. Solenoid 140 is moved to the open position wherein pins 135 and pinch roller 137 are substantially above the transducers as indicated in FIG. 15. The two reels 15 and 16 are rotated so that the stretch of tape between the two guide rollers 125 and 126 is taut and straight. Reel locking mechanism 170 retains the reels in condition with sufficient tension on the tape stretch between the two rollers 125 and 126 so that the tape stretch will remain constant and straight. The magazine is then installed on main body A by inserting tab 34 into notch 35 and thence rotating the magazine into position so that the two shafts 125 and 126 will nest against coupling head 45 of reel 16 and collar 65 of reel 15 wherein pins 48 and 70 will each nest in one of the several apertures 46 and 69. The purpose of providing the two annular closely spaced aperture rings and the lesser number of mating pins is to allow the pins to engage in positive locking engagement with the reel hubs regardless of the relative position between the shafts and the reels at the time the magazine is installed on main body A.

The magazine is locked in position by snap connector elements 36. Pin 178 thus penetrates the magazine and disengages reel locking mechanism or brake means 170 from locking engagement with the two reels. In this condition of operation the two nylon belts 155 and 159 lock the two driven pulleys 95 and 96 in position so that the two reels are retained in fixed position.

To cause the device to operate so that magnetic reading and writing can be effected the capstan drive motor 131 is energized to cause the capstan to drive at the required speed. The speed may be varied by selecting various pulley arrangements in pulley drive mechanism 132 or by varying the input to motor 131. Constant torque motor 100 is then energized at low power to move in the forward direction whereinafter solenoid 119 is energized to cause clutch idler 115 to move into clutching engagement between driving pulley 105 and driven pulley 95 thus causing a constant torque force against reel 15. At the same instant solenoid 140 is energized to cause magnetic transducer assembly 18 and tape drive assembly 19 to go into operative engagement with the tape thus forcing pinch roller 137 against capstan 130 to forcefully drive the tape through the recording deck. With the application of power to solenoid 119, solenoid 151 is also energized to cause disengagement of nylon belts 155 and 159 from engagement with driven pulleys 96 and 95 while simultaneously solenoid 140 causes a tensioning of string 165 to exert sufficient tension against nylon belt 159 to cause a bias braking force against reel 16 so as to maintain the tape stretch tensioning between the two guide rollers 125 and 126 and across the recording deck.

To cause the tape to move in the rapid forward wind, solenoid 140 is moved in the opposite direction to disengage magnetic transducer assembly 18 and tape drive mechanism 19 from engagement with the tape and simultaneously motor 100 is supplied with sufficient power to cause reel 15 to rapidly wind tape from reel 16. At the same time the tensioning of string 165 is reduced so as to render brake or belt 159 completely free from braking contact with driven pulley 95 thus allowing for the free forward wind of the tape on the reel.

To stop the device solenoid 119 is released to withdraw clutch idler 115 from clutching engagement between the motor and reel 15 which simultaneously disengages solenoid 151 so that spring 153 causes the two nylon belts 155 and 159 to brake and stop the rotation of the two reels.

To cause the tape to operate in the reverse direction, that is to rewind the tape, constant torque motor 100 is energized to cause the motor to rotate in the reverse direction. Solenoid 120 is then actuated to cause clutching idler 116 to engage driving pulley 106 and driven pulley 96. At the same time solenoid 151 is energized to de-energize the brake mechanism thus causing the tape to rewind onto reel 16 from reel 15. To stop the device solenoid 120 is released to withdraw clutch idler 116 from engagement with the driving and driven pulleys and solenoid 151 is released to actuate the brake mechanism.

Figure 16:
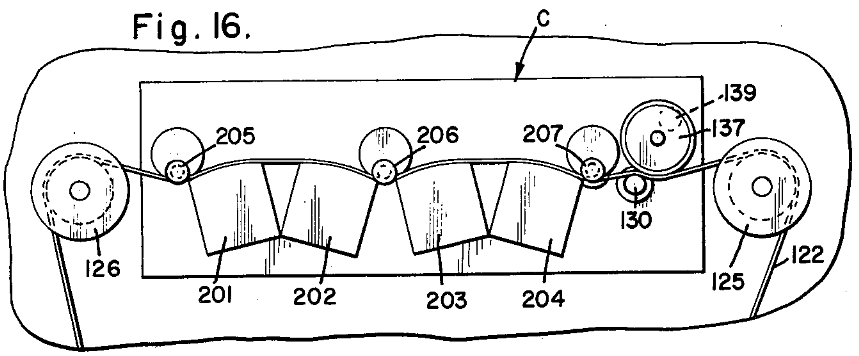
FIG. 16 is a plan view of a modification of the recording deck.

Referring now to FIG. 16 there is provided a modification of the placement transducer and tape drive mechanism on the recording deck.

There is provided four transducers indicated at 201, 202, 203 and 204. Two transducers 201 and 202 are located adjacent one another and orientated at an angle of approximately 5° from an angle normal to the longitudinal axis of tape travel past the transducer so that the relative angle of displacement between the two transducers is approximately 10°. The two transducers 203 and 204 are similarly arranged at the same angular displacement relative to one another.

Tape guide pins 205, 206 and 207 are mounted so that a pair fo pins straddle each pair of transducers. Tape guide pins 205, 206 and 207 are eccentrically mounted to move from a first position substantially above the transducer to a second position substantially below the upper face of the transducers. Pin 205 is on the leading end of the tape deck adjacent transducer 201. Pin 206 is between transducers 202 and 203 and pin 207 is located on the trailing edge of recording deck C between transducer 204 and capstan 130.

As can be seen in FIG. 16 when pins 205, 206 and 207 are moved to their operative position the tape travel between pins 205 and 206 is guided by the lower face of the pins over transducers 201 and 202 in such a manner that the tape travel across the middle of the transducer is substantially normal to the axis of the transducer. This relationship is created by the placement of the angle of the two transducers to one another and by the adjustment of the elevation of the pins relative to the transducers. Thus the tape is enabled to travel in a substantially arcuate path between pins over the transducers with the tape travel in the transducer being substantially normal to the axis of the transducer.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A device for recording on tape comprising: a pair of coaxial independently rotatable shafts; means for independently rotating at least one of said shafts; means to bias at least one of said shafts against free rotation; a recording deck having at least one transducer and a tape drive capstan assembly; means mounted under said recording deck to drive said capstan assembly; a magazine mounted over said coaxial shafts and recording deck; a pair of stacked independently rotatable axially aligned tape carrying reels mounted within said magazine; means connecting each of said reels to one of said coaxial shafts; said reels being adapted to carry a tape; guide means mounted within said magazine to guide a stretch of tape between said reels and across said recording deck; said guide means having at least one element aligned with each said reel to guide the stretch of tape to travel in a coplanar path between said reels; said recording deck being aligned to position said transducer and capstan assembly in coplanar alignment with said tape stretch; said magazine being removably mounted relative to said coaxial shafts and said recording deck; said magazine having front and rear faces disposed in parallel spaced relation; and bearing means attaching each of said reels on opposite inside walls of said faces; means to pivotally mount said front face relative to said rear face to allow said front face to swing into an open position out of parallel alignment with said rear face.

2. A device according to claim 1 and wherein said tape guide means are mounted on the inside wall of said rear face.

3. A device according to claim 1 and wherein said magazine is formed with first and second reel brake means; said first reel brake means being mounted on the inside face of said front wall and said second reel brake means being mounted on the inside face of said rear wall; each of said brake means normally biased against the outer edge of said tape reels to prevent rotation of said reels; spring means normally biasing said brake means in engagement with the edge of said reels; and means to position said first brake means out of engagement with the reel mounted on said rear face when said magazine is mounted on said coaxial shafts.

4. In a tape recorder the combination of: a tape deck; a pair of coaxially mounted independently rotatable shafts mounted on said deck and having a top portion projecting outwardly from the front face of the deck; means mounted under the rear face of said deck to independently drive said shafts; a magazine having two hinged juxtaposed spaced panels; said panels being movable to a first position in relative coplanar relation and to a second position out of coplanar relation; and a pair of tape carrying reels each rotatably affixed on a respective one of the inside faces of said panels; each of said reels being mounted in relative axial alignment when said panels are in the second position.

5. A device for driving magnetic tape comprising: a removable frame including a pair of stacked reels and means to guide magnetic tape to travel in a coplanar stretch from a position in coplanar alignment with one of said reels to a position in coplanar alignment with the other of said reels; and a fixed frame including a magnetic recording deck; at least one magnetic transducer and a capstan drive assembly mounted in coplanar alignment on said recording deck; and means to adjust the angular position of said recording deck relative to said stretch of tape on said removable frame to align the transducer and capstan driving assembly in coplanar alignment with said tape stretch.

6. In a tape recording apparatus of the type having a magazine the combination of: a pair of stacked tape reels rotatably mounted on opposite inside walls of said magazine; hinge means rotatably connecting opposite inside walls of said magazine to allow said walls and tape reels to be moved to a closed position and to an open position; said reels being aligned in axial alignment when said opposite walls of said magazine are in the closed position in substantially side by side relation when said opposite walls are in the open position and means to guide tape to travel in a co-planar stretch across a recording deck from a position in co-planar alignment with one of said reels to a position in co-planar alignment with the other of said reels.

7. In a tape recorder the combination of: a main body unit and a magazine removably mountable on said main body unit; a pair of coaxial shafts mounted on said main body unit and projecting outwardly therefrom; a pair of axially aligned reels mounted within said magazine; said magazine being apertured in axial alignment with said reels and in alignment with said coaxial shafts to allow said shafts to mate in driving relationship with said reels when said magazine is mounted on said main body unit; a recording deck mounted on said main body unit; said magazine being apertured to receive said recording deck within the interior of said magazine when said magazine is mounted on said main body unit; means rotatably affixing each of said reels on opposite faces of said magazine; means rotatably affixing the reel carrying faces of said magazine relative to each other to allow said faces to be moved to an open and a closed position; tape guide means mounted with said magazine to guide tape travel within said magazine across the recording deck; and means carried by said main body unit to adjust the relative position of said recording deck relative to the tape stretch in said magazine to effect alignment between said recording deck and said tape stretch.

8. In a tape recorder of the type having a main body unit and a magazine removably mountable on said main body unit; a pair of coaxial shafts mounted on said main body unit and projecting outwardly therefrom; a pair of axially aligned reels mounted within said magazine; said magazine being apertured in axial alignment with said reels and in alignment with said coaxial shafts to allow said shafts to mate in driving relationship with said reels when said magazine is mounted on said main body unit; a recording deck mounted on said main body unit; said magazine being apertured to receive said recording deck within the interior of said magazine when said magazine is mounted on said main body unit the improvement comprising: means rotatably affixing each of said reels on opposite faces of said magazine; means to rotatably mount the reel carrying faces of said magazine relative to each other to allow said faces and said reels to be moved to an open and a closed position; tape guide means mounted within said magazine to guide tape travel within said magazine across the recording deck; means carried by said main body unit to adjust the relative position of said recording deck relative to the tape stretch in said magazine to effect alignment between said recording deck and said tape stretch; brake means mounted on the two opposite reel carrying faces of said magazine biased to normally lock said reels against rotation; brake disengaging means to disengage both said brake means from reel engagement mounted on said main body unit and projecting interiorly of said magazine; and means to render said brake disengaging means inoperative to disengage biasing of one of said brake means mounted when said plates are in the open position.

9. A tape recording device of the type having a pair of coaxial independently rotatable shafts; a recording deck having transducer means and tape drive means to drive tape past said transducer means; a magazine mounted over said coaxial shafts and recording deck; and a pair of stacked independently rotatable axially aligned tape carrying reels mounted within said magazine; comprising tape guide means mounted within said magazine and having at least one element aligned with each said reel to form a straight stretch of recording tape between the planes of said reels and across said recording deck; and means to adjustably align said recording deck so the transducer and tape drive means are in alignment with the straight stretch of tape formed between said tape guide means.

10. In a tape recording mechanism of the type having a main body and a magazine being adapted to be mounted over said main body the improvement comprising: said magazine having a front and rear plate; hinge means connecting said front and rear plates to allow said front and rear plates to open and close in book like fashion; first and second tape carrying reels rotatably mounted on the inside faces of said front and rear plates in axial alignment when said plates are in closed condition; first reel brake means mounted on the inside face of said rear plate; second brake means mounted on the inside face of said front plate; each of said brake means normally biased against the outer edge of said tape reels to prevent rotation of said reels; means mounted on said main body to position said first brake means out of engagement with said second reel when said magazine is mounted on said body; said first brake means operable to move said second brake means out of contact with said first tape reel when said first brake means is in the disengaged condition and said first and second plates of said magazine are in the closed position and not when in the open position.

11. In a tape drive mechanism for feeding tape off of a first reel and onto a second reel in which said reels are disposed in stacked relationship the combination of: a first frame, a first tape guide roller mounted on said first frame and disposed in elevational alignment with the first reel; a second tape guide roller mounted on said first frame and disposed in elevational alignment with the second reel, said first and second tape guide rollers constructed and arranged to form a tape stretch therebetween, a second frame, a recording deck, at least one magnetic transducer and a capstan drive assembly arranged in linear alignment on said recording deck, means for removably mounting said first frame on said second frame, mounting means holding the recording deck in a position on said second frame where at the linear aligned axis of said transducer and said capstan assembly is in linear alignment with said tape stretch, and means associated with said mounting means to vary the position of said recording deck to maintain said linear alignment.

References Cited in the file of this patent

UNITED STATES PATENTS

| | | |
|---|---|---|
| 1,548,960 | Stuber et al. | Aug. 11, 1925 |
| 1,933,797 | Fritts | Nov. 7, 1933 |
| 1,933,807 | Hopkins | Nov. 7, 1933 |
| 2,013,109 | Reynolds | Sept. 3, 1935 |
| 2,157,676 | Rose | May 9, 1939 |
| 2,422,635 | Steiner | June 17, 1947 |
| 2,449,773 | Hargreaves et al. | Sept. 21, 1948 |
| 2,632,060 | Foote et al. | Mar. 17, 1953 |
| 2,668,021 | Gleason | Feb. 2, 1954 |
| 2,678,820 | Masterson | May 18, 1954 |
| 2,711,104 | Shields | June 21, 1955 |
| 2,713,618 | McNabb | July 19, 1955 |
| 2,854,856 | Oppen | Oct. 7, 1958 |
| 2,894,700 | Roberts et al. | July 14, 1959 |
| 2,899,507 | Martel | Aug. 11, 1959 |
| 2,923,380 | Selsted et al. | Feb. 2, 1960 |
| 2,941,737 | Jones | June 21, 1960 |
| 2,996,229 | Loewe | Aug. 15, 1961 |
| 3,002,706 | Flan et al. | Oct. 3, 1961 |

FOREIGN PATENTS

| | | |
|---|---|---|
| 966,252 | France | Mar. 1, 1950 |